United States Patent
Ledermann et al.

(10) Patent No.: US 12,360,010 B2
(45) Date of Patent: Jul. 15, 2025

(54) METHOD FOR DIAGNOSING A WIDEBAND LAMBDA SENSOR

(71) Applicant: Robert Bosch GmbH, Stuttgart (DE)

(72) Inventors: Bernhard Ledermann, Weil der Stadt (DE); Stefan Kremer, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 230 days.

(21) Appl. No.: 18/245,918

(22) PCT Filed: Oct. 4, 2021

(86) PCT No.: PCT/EP2021/077210
§ 371 (c)(1),
(2) Date: Mar. 20, 2023

(87) PCT Pub. No.: WO2022/078784
PCT Pub. Date: Apr. 21, 2022

(65) Prior Publication Data
US 2023/0384184 A1 Nov. 30, 2023

(30) Foreign Application Priority Data
Oct. 13, 2020 (DE) ...................... 10 2020 212 885.5

(51) Int. Cl.
*G01M 15/10* (2006.01)
(52) U.S. Cl.
CPC ................. *G01M 15/104* (2013.01)

(58) Field of Classification Search
CPC ............ G01M 15/104; G01N 27/4065; G01N 27/4175
See application file for complete search history.

(56) References Cited

U.S. PATENT DOCUMENTS

2012/0293183 A1* 11/2012 Ledermann ........ G01N 27/4065
324/543

FOREIGN PATENT DOCUMENTS

| DE | 102008011231 A1 | 5/2009 |
| DE | 102008001697 A1 | 11/2009 |
| DE | 102011077171 A1 | 11/2012 |
| DE | 102019203687 A1 | 9/2020 |
| DE | 102019204827 A1 | 10/2020 |

OTHER PUBLICATIONS

International Search Report for PCT/EP2021/077210, Issued Jan. 17, 2022.

* cited by examiner

*Primary Examiner* — Timothy P Graves
(74) *Attorney, Agent, or Firm* — NORTON ROSE FULBRIGHT US LLP; Gerard A. Messina

(57) ABSTRACT

A control unit and a method for diagnosing lines between a wideband lambda sensor and the control. By means of specific circuitry and evaluation, it is determined, for each individual line, whether or not there is an interruption or failure of the line in question. A method for more accurately measuring the value of a calibration resistor of the wideband lambda sensor is also described.

16 Claims, 4 Drawing Sheets

METHOD FOR DIAGNOSING A WIDEBAND LAMBDA SENSOR

BACKGROUND INFORMATION

A control unit for operating a wideband lambda sensor and associated operating methods are described in German Patent Application No. DE 10 2008 001 697 A1.

However, the problem of reliably determining whether or not lines between the wideband lambda sensor and the control unit are interrupted has not yet been solved.

SUMMARY

The present invention makes it possible to reliably determine whether or not lines between the wideband lambda sensor and the control unit are interrupted.

In the context of the control unit according to the present invention and the methods according to the present invention, a wideband lambda sensor is assumed, comprising a first electrical connector IPE and a second electrical connector APE and a third electrical connector MES and comprising an electrochemical pump cell connected between the first electrical connector IPE and the second electrical connector APE, and comprising an electrical calibration resistor connected between the second electrical connector APE and the third electrical connector MES.

The wideband lambda sensor may comprise a fourth electrical connector and may comprise an electrochemical reference cell connected between the first electrical connector and the fourth electrical connector.

According to an example embodiment of the present invention, the control unit according to the present invention comprises the following:
a first electrical input IPE',
a second electrical input APE',
a third electrical input MES',
a measuring resistor connecting the second input APE' to the third input MES',
a current source which can be connected to the second input APE' by an intermediate switch $Swt_{APE}$,
a further switch $Swt_{MES}$ and a reference resistor, wherein the the reference resistor on the one hand can be connected via the further switch $Swt_{MES}$ to the third input MES' and to the measuring resistor and on the other hand is connected to a reference potential,
a measuring means (i.e., measuring arrangement) for measuring the voltage $U_{am}$ dropping across the measuring resistor.

The measuring means may be an analog-digital converter. The voltage dropping across the measuring resistor can then be further processed digitally.

According to an example embodiment of the present invention, it may be provided that the control unit comprises a multiplexer connected on the input side to the second input APE' and the third input MES' and connected on the output side to the measuring means.

The method according to an example embodiment of the present invention for diagnosing electrical lines between the control unit and a wideband lambda sensor provides that a first line connects the first connector IPE of the wideband lambda sensor to the first input IPE' of the control unit, a second line connects the second connector APE of the wideband lambda sensor to the second input APE' of the control unit, and a third line connects the third connector MES of the wideband lambda sensor to the third input MES' of the control unit, and this is carried out in the following steps:
measuring the voltage dropping across the measuring resistor with intermediate switch $Swt_{APE}$ closed and further switch $Swt_{MES}$ open,
evaluating whether the second line is interrupted and/or evaluating whether the third line is interrupted, wherein the evaluation/the respective evaluation is carried out on the basis of the voltage dropping at the measuring resistor.

According to an example embodiment of the present invention, it may be provided that the evaluation as to whether the second line is interrupted is carried out on the basis of the comparison of the voltage dropping at the measuring resistor to an upper specified threshold value, and/or the evaluation as to whether the third line is interrupted is carried out on the basis of the comparison of the voltage dropping at the measuring resistor to a lower specified threshold value.

In particular, it may be provided that it is evaluated that the second line is interrupted if the voltage dropping at the measuring resistor is greater than an upper specified threshold value; that the third line is interrupted if the voltage dropping at the measuring resistor is less than a lower specified threshold value; and/or that neither the first line is interrupted nor the second line is interrupted if the voltage dropping at the measuring resistor is greater than the lower threshold value and is less than the upper threshold value.

A development of the present invention is carried out in response to the observation that the voltage dropping at the measuring resistor in the case of an intact second line and an intact third line can in some circumstances be so small that it causes increased technical effort to reliably distinguish it from an even smaller voltage (e.g., voltage 0V), which indicates an interrupted third line in the framework of the method.

This is counteracted according to the development of the present invention in that a first voltage dropping across the measuring resistor is measured while the current source generates a first current, and in that a second voltage dropping across the measuring resistor is measured while the current source generates a second current, wherein the second current is stronger than the first current, and in that the evaluation as to whether the second line is interrupted is carried out on the basis of the second voltage dropping at the measuring resistor, and the evaluation as to whether the third line is interrupted is carried out on the basis of the first voltage dropping at the measuring resistor. For example, the first current may be 0.1 mA and the second current may be 10 mA. For example, the current source may comprise corresponding constant current sources, which can correspondingly be connected via switches, for example.

In response to the same problem, it may be provided in an additional or alternative development that a pre-evaluation is initially carried out that (or as to whether) one of the second line and the third line is interrupted.

Only if this is the case, the diagnostic method is continued by evaluating that the second line is interrupted if the voltage dropping at the measuring resistor is greater than a limit value, and by evaluating that the third line is interrupted if the voltage dropping at the measuring resistor is not greater than the limit value.

In principle, the pre-evaluation can be carried out on the basis of any suitable measurements and/or criteria. For example, the pre-evaluation may be carried out in the following method steps:

measuring the voltage dropping across the measuring resistor with intermediate switch $Swt_{APE}$ closed and further switch $Swt_{MES}$ closed, evaluating that one of the second line or the third line is interrupted if the voltage dropping at the measuring resistor is greater than a minimum value.

In this context, an example embodiment of the present invention also comprises a method for determining the value of the calibration resistor of the wideband lambda sensor. This determination is carried out on the basis of a first measurement of the voltage dropping at the measuring resistor with intermediate switch $Swt_{APE}$ closed and further switch $Swt_{MES}$ closed.

In a development thereto, a second measurement of the voltage dropping at the measuring resistor can be carried out with intermediate switch $Swt_{APE}$ closed and further switch $Swt_{MES}$ open, wherein the value of the calibration resistor is determined on the basis of the first measurement and the second measurement in such a way that the influence of the resistance of the second line on the result is compensated.

In the framework of the present invention, evaluations are performed at various locations as to whether or not a certain event has occurred, for example whether a line is interrupted or intact. On a technical level, such an evaluation can be realized by setting a memory bit in an electronic memory of the control unit to a value assigned to the corresponding evaluation (for example, "low" or "high").

DETAILED DESCRIPTION OF EXAMPLE EMBODIMENTS

Figure 1:
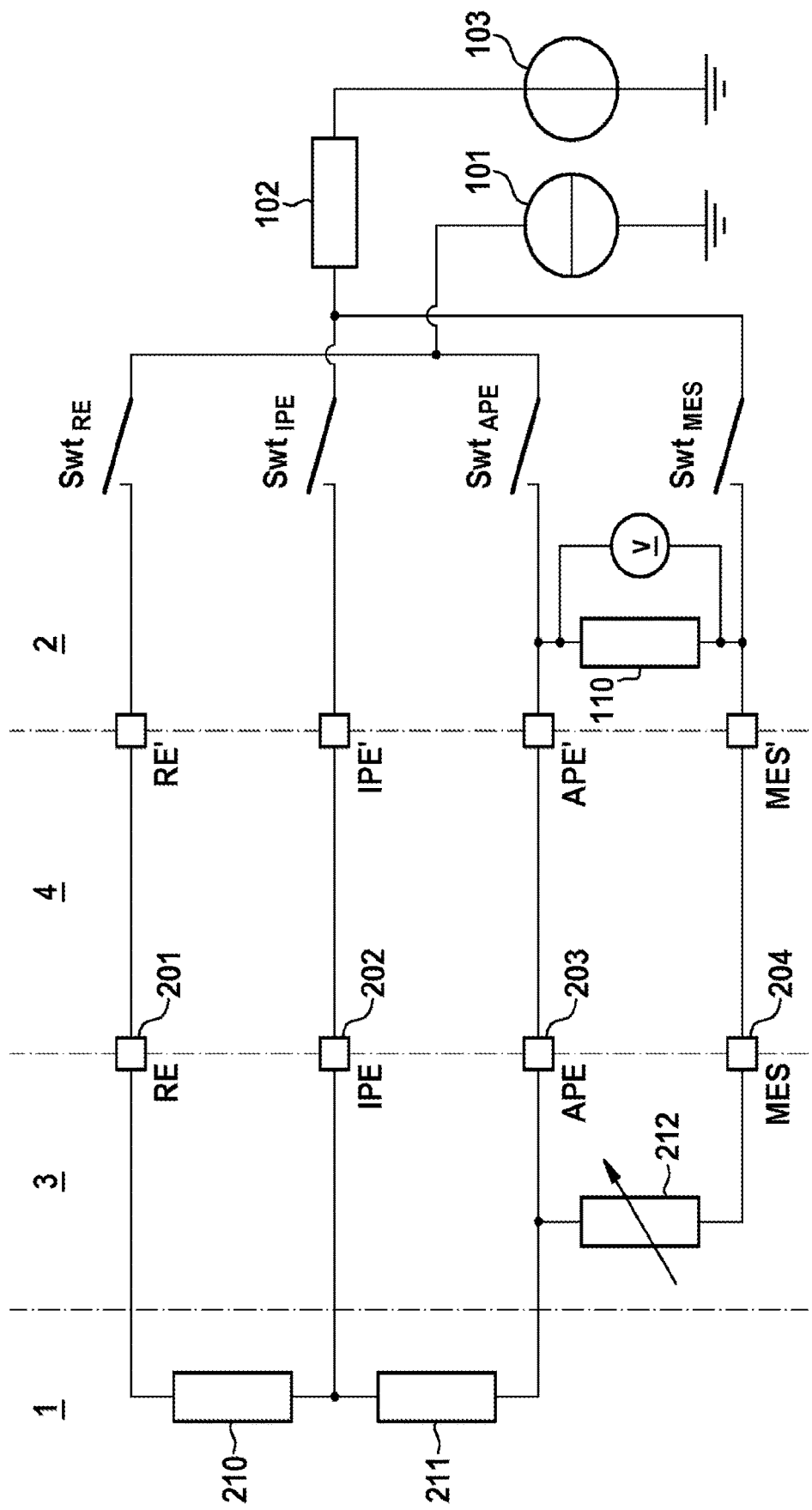
FIG. 1 shows an example of a device according to an example embodiment of the present invention in a first switching state.

FIG. 1 shows a control unit 2 in connection with a wideband lambda sensor 1 as a schematic circuit diagram. The connection is made via a plug 3 of the wideband lambda sensor 1 and via a cable harness 4.

The wideband lambda sensor 1 comprises a first electrical connector IPE, a second electrical connector APE, a third electrical connector MES and a fourth electrical connector RE. The wideband lambda sensor 1 furthermore comprises an electrochemical pump cell 211 connected between the first electrical connector IPE and the second electrical connector APE, and an electrochemical reference cell 210 connected between the first electrical connector IPE and the fourth electrical connector RE. The wideband lambda sensor 1 furthermore comprises an electrical calibration resistor 212, which can be adjusted by laser cut, for example, and is connected between the second electrical connector APE and the third electrical connector MES. In the example, the electrical calibration resistor 212 is located in a plug 3 of the wideband lambda sensor 1, which plug can be connected to the wiring harness 4.

The control unit 2 comprises a first electrical input IPE', a second electrical input APE', a third electrical input MES', and a fourth electrical input RE'. It comprises a measuring resistor 110 connecting the second input APE' to the third input MES', it comprises a current source 101 which can be connected to the second input APE' by an intermediate switch $Swt_{APE}$ of the control unit 2, and it comprises a further switch $Swt_{MES}$ and a reference resistor 102, wherein the reference resistor 102 on the one hand can be connected via the further switch $Swt_{MES}$ to the third input MES' and to the measuring resistor 110 and on the other hand is connected to a reference potential 103 of the control unit 2. The first input IPE' of the control unit 2 can be connected via a first switch $Swt_{IPE}$ to the reference resistor 102. The fourth input RE' of the control unit 2 can be connected via a fourth switch $Swt_{RE}$ to the current source 101.

The control unit 2 furthermore comprises a measuring means V for measuring the voltage $U_{am}$ dropping across the measuring resistor 110. In this example, it is an analog-digital converter with two inputs, which can be connected via a multiplexer of the control unit 2 to the second input APE' and the third input MES' of the control unit 2.

The wiring harness 4 comprises four lines, namely, a first line 202 connecting the first connector IPE of the wideband lambda sensor 1 to the first input IPE' of the control unit 2, a second line 203 connecting the second connector APE of the wideband lambda sensor 1 to the second input APE' of the control unit 2, a third line 204 connecting the third connector MES of the wideband lambda sensor 1 to the third input MES' of the control unit 2, and a fourth line 201 connecting the fourth connector RE of the wideband lambda sensor 1 to the fourth input RE' of the control unit 2.

In FIG. 1, the intermediate switch $Swt_{APE}$, the further switch $Swt_{MES}$, the first switch $Swt_{IPE}$, and the fourth switch $Swt_{RE}$ are shown open. During operation of the lambda sensor 1 and in the framework of the methods according to the present invention, on the other hand, the switches are controlled individually, as explained in detail below.

In the framework of the present invention, the current source 101 generates currents and impresses them into the relevant circuit, at least once the second switch $Swt_{APE}$ is closed. For example, the current source 101 may be a constant current source that generates, for example selectively, a current of 0.1 mA or a current of 10 mA, for example.

For example, in the diagnosis of electrical lines 203, 204 between the control unit 2 and the wideband lambda sensor 1, it is provided that the intermediate switch $Swt_{APE}$ is closed, that the first switch $Swt_{IPE}$ is closed, and that the further switch $Swt_{MES}$ is open. The fourth switch $Swt_{RE}$ may be open, see FIG. 2.

In this switching configuration, a current I flows from the current source 101 through the second line 203, through the pump cell 211, through the first line 202, via the reference resistor 102 to the reference potential 103. In parallel to the second line 203, the measuring resistor 110, the third line 204, and the calibration resistor 212 are connected in series with one another. In this switching configuration, the voltage $U_{am}$ dropping across the measuring resistor 110 is measured by the measuring means V.

Figure 2:
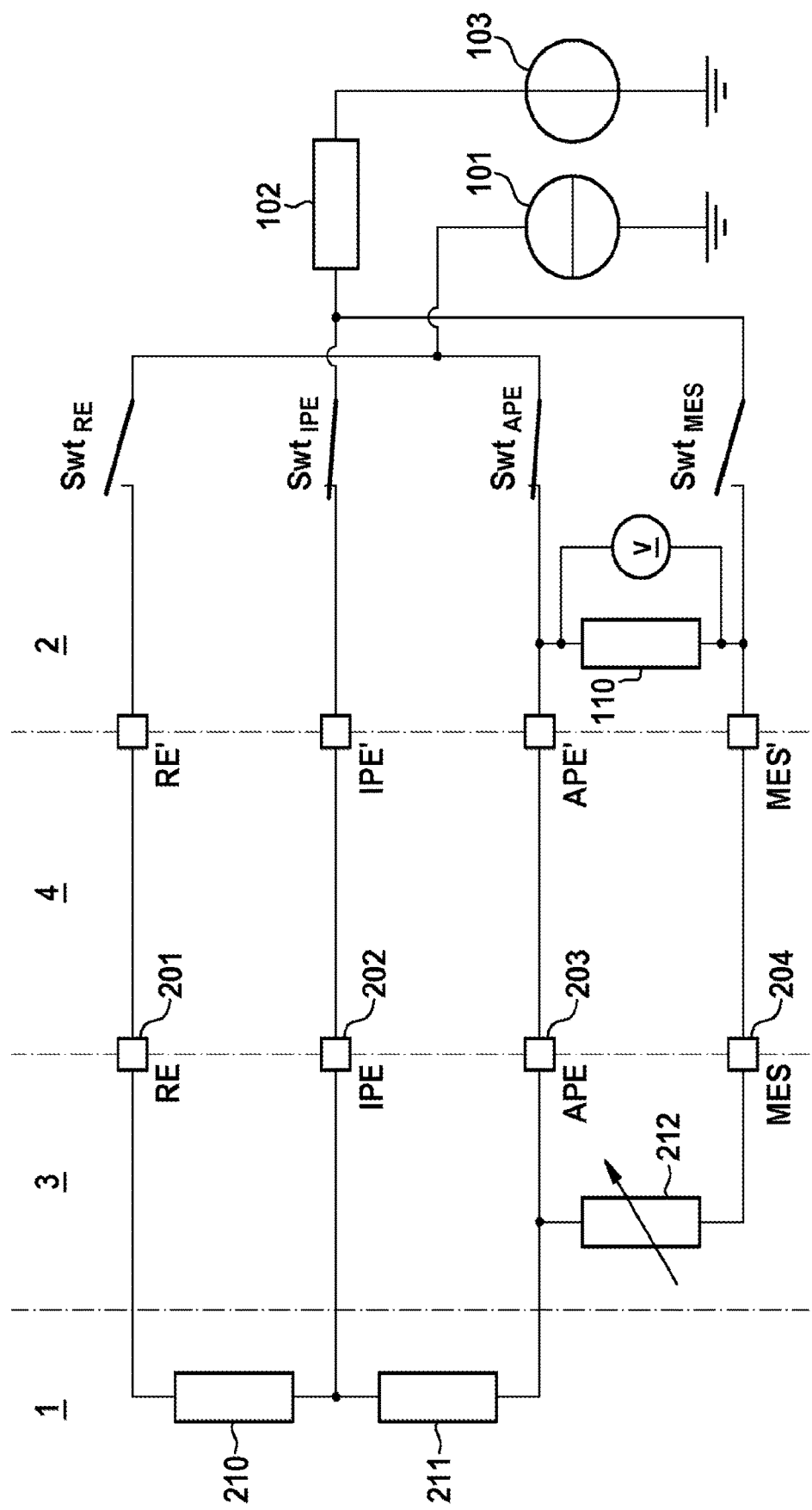
FIG. 2 shows the device of FIG. 1 in a second switching state.

The switching configuration according to FIG. 2 corresponds to a switching configuration that is also used within the scope of measuring an oxygen concentration in an exhaust gas of a combustion engine by the wideband lambda sensor 1. The current I supplied by the current source 101 causes, optionally as a pulse width modulated signal, a corresponding oxygen ion flow through the pump cell 211, the average value of which flow is proportional to the oxygen concentration in the exhaust gas. Usually, the current I (on average) supplied by the current source 101 can be the control variable of a control loop, the input variable of which is a Nernst voltage forming at the reference cell 210 of the wideband lambda sensor 1. The latter is usually controlled to a target value, for example 450 mV.

In this respect, the diagnostic method according to the present invention can be carried out at least in part at the same time as the operation of the wideband lambda sensor 1 for measuring an oxygen concentration in an exhaust gas of a combustion engine.

If the measurement method as such in this case provides only insufficiently large (average) pump currents in a time interval in which a diagnosis is desired, there is the possibility of impressing additional pump current pulses from the perspective of the measurement method. These additional pump currents may advantageously be provided in the form of pulses and counter-pulses with different polarity from one another. In this way, the diagnostic method even in this case has only minimal side effects on the measurement method, and consequently, where applicable, on the operation of the combustion engine.

In the example, it is assumed that with intact lines 203, 204, the resistance values of the second and the third line 203, 204 are significantly less than the resistance values of the calibration resistor 212 and of the measuring resistor 110, for example by a factor of 100 or 1000 less in each case. The voltage $U_{am}$ dropping at the measuring resistor 110 consequently has a small value that is nevertheless different from 0V, for example 50 µV or 5 mV.

In the example, it is furthermore assumed that in the case of an interrupted third line 204 but an intact second line 203, the resistance value of the third line 204 is very large (precisely because of the interruption), significantly greater than the resistance value of the second line 203, for example infinite. A current then no longer flows through the measuring resistor 110 and the voltage dropping at the measuring resistor 110 consequently has the value 0V.

In the example, it is furthermore assumed that in the case of an interrupted second line 203 but an intact third line 204, the resistance value of the second line 203 is very large (again, precisely because of the interruption), for example again infinite. The current I generated by the current source 101 then flows completely through the measuring resistor 110 and the voltage dropping at the measuring resistor 110 is quite large, for example 300 mV.

In the example, a lower threshold value is now specified, for example 25 mV, and an upper threshold value is specified, for example 100 mV. The voltage $U_{am}$ dropping at the measuring resistor 110 is compared to these threshold values.

In this first example, it is evaluated that the second line 203 is interrupted if the voltage $U_{am}$ dropping at the measuring resistor 110 is greater than the upper specified threshold value, that the third line 204 is interrupted if the voltage $U_{am}$ dropping at the measuring resistor 110 is less than the lower specified threshold value, and that neither the second line 203 is interrupted nor the third line 204 is interrupted if the voltage $U_{am}$ dropping at the measuring resistor is greater than the lower threshold value and is less than the upper threshold value.

Figure 4:
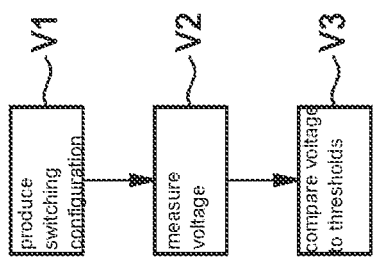
FIG. 4 shows a flow chart of the method steps of the first example of a method according to the present invention for diagnosing electrical lines.

The method steps according to this example are shown by way of example in FIG. 4 as a flow chart:

Step V1: producing a switching configuration according to FIG. 2 with intermediate switch $Swt_{APE}$ closed and further switch $Swt_{MES}$ open as well as first switch $Swt_{IPE}$ closed and fourth switch $Swt_{RE}$ open, Step V2: measuring the voltage $U_{am}$ dropping across the measuring resistor 110, Step V3: comparing the voltage $U_{am}$ dropping across the measuring resistor 110 to an upper specified threshold value and to a lower specified threshold value, and evaluating that the second line 203 is interrupted if the voltage $U_{am}$ dropping at the measuring resistor 110 is greater than the upper specified threshold value, that the third line 204 is interrupted if the voltage $U_{am}$ dropping at the measuring resistor 110 is less than the lower specified threshold value, and that neither the second line 203 is interrupted nor the third line 204 is interrupted if the voltage $U_{am}$ dropping at the measuring resistor 110 is greater than the lower threshold value and less than the upper threshold value.

The evaluation according to the first example presupposes that comparatively small voltages $U_{am}$ can be distinguished from the voltage 0V, i.e., a high measurement accuracy of the measuring means V is given.

Figure 3:
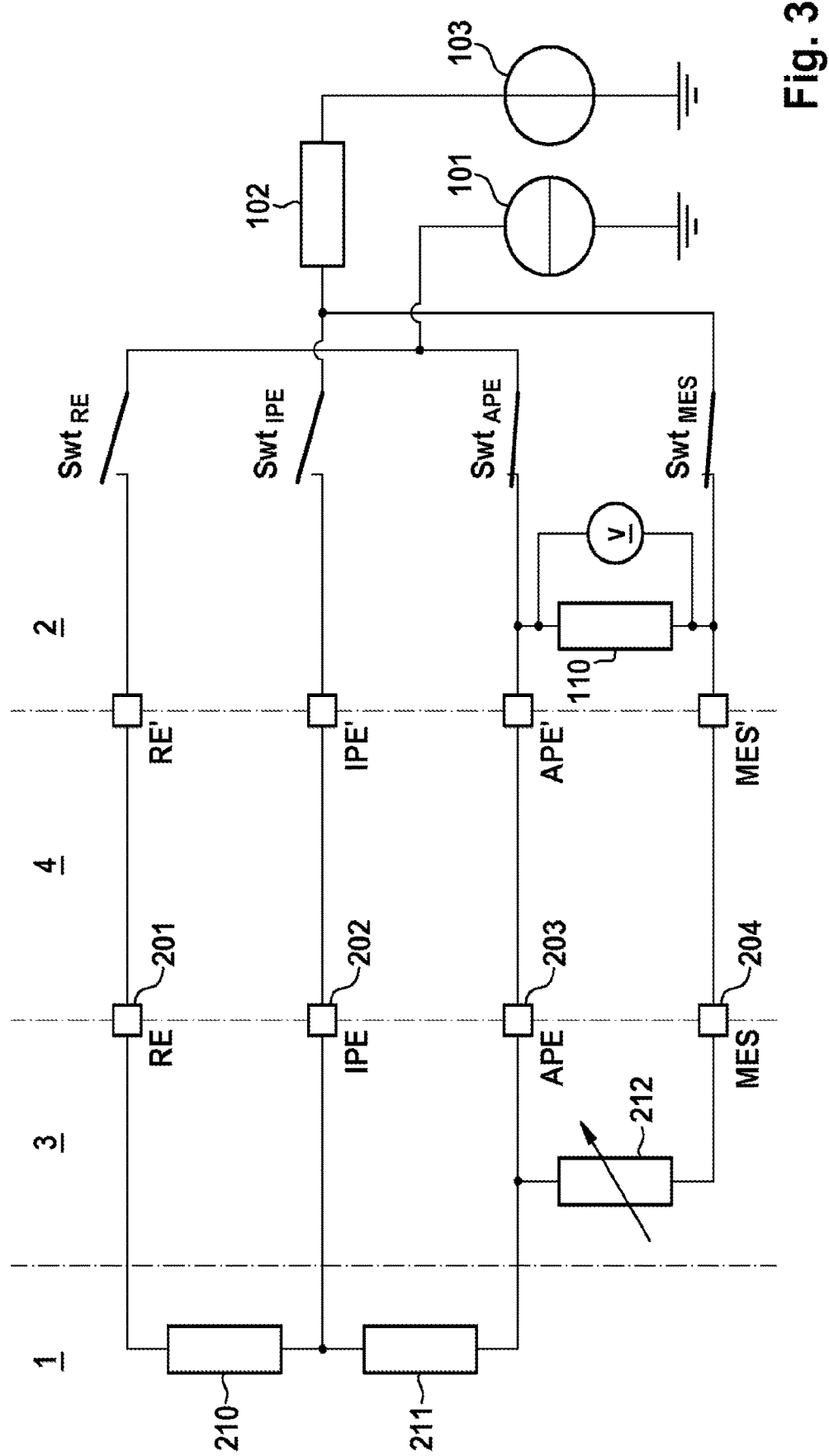
FIG. 3 shows the device of FIG. 1 in a second switching state.

In a second example, this is not necessarily the case. Here, a switching configuration according to FIG. 3 is first produced, i.e., the intermediate switch $Swt_{APE}$ and the further switch $Swt_{MES}$ are closed, the first switch $Swt_{IPE}$ and the second switch $Swt_{RE}$ are open. If the voltage $U_{am}$ thus dropping at the measuring resistor 110 is less than a specified limit value (in the example 100 mV), the reason for this is that a rather small current flows through the measuring resistor 110 because the second and third lines 203, 204 are intact. In this case, this evaluation is performed directly.

Only otherwise, i.e., if in the switching configuration shown in FIG. 3, the voltage $U_{am}$ dropping at the measuring resistor 110 is greater than the specified limit value (in the example 100 mV), the reason for this is that a rather large current flows through the measuring resistor 110 because both the second and third lines 203, 204 are not intact, i.e., because the second line 203 is interrupted or because the third line 204 is interrupted.

In order to yet distinguish these two cases, the switching configuration shown in FIG. 2 is then brought about as in the first example, i.e., that the intermediate switch $Swt_{APE}$ is closed, that the first switch $Swt_{APE}$ is closed, and that the further switch $Swt_{MES}$ and the fourth switch $Swt_{RE}$ are open.

In contrast to the first example, however, the voltage $U_{am}$ dropping at the measuring resistor 110 is now only compared to the upper threshold value (e.g., 100 mV). If it is greater than the upper threshold value, it is evaluated that the second line 203 is interrupted. If it is not greater than the upper threshold value, it is concluded that the third line 204 is interrupted. The latter is justified since it has already been determined (see above) that at least one of the second and the third lines 203, 204 is interrupted, i.e., the possibility that none of these two lines 203, 204 is interrupted has already been excluded at this point of the method.

Figure 5:
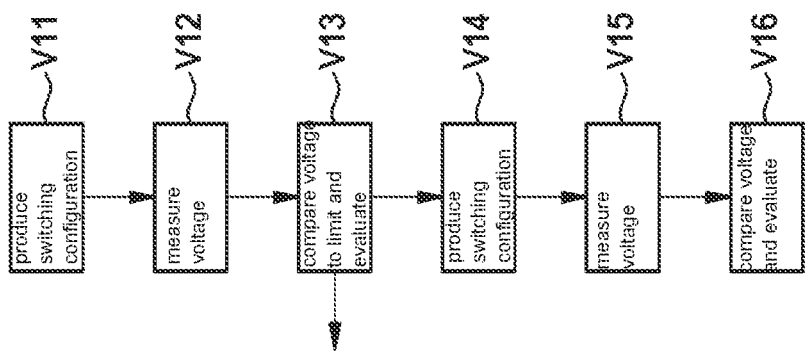
FIG. 5 shows a flow chart of the method steps of the second example of a method according to the present invention for diagnosing electrical lines.

The method steps according to this example are shown as a flow chart in FIG. 5:

Step V11: producing a switching configuration according to FIG. 3, i.e., the intermediate switch $Swt_{APE}$ and the further switch $Swt_{MES}$ are closed, the first switch $Swt_{APE}$ and the second switch $Swt_{RE}$ are open, Step V12: measuring the voltage $U_{am}$ dropping across the measuring resistor 110, Step V13: comparing the voltage $U_{am}$ dropping across the measuring resistor 110 to a limit value, and evaluating whether both the second and the third line 203, 204 are intact. In this case, the method ends. Otherwise, i.e., if one of the second line 203 and the third line 204 is interrupted, the method is continued with step V14.

Step V14: producing a switching configuration according to FIG. 2 with intermediate switch $Swt_{APE}$ closed and further switch $Swt_{MES}$ open as well as first switch $Swt_{APE}$ closed and fourth switch $Swt_{RE}$ open, Step V15: measuring the voltage $U_{am}$ dropping across the measuring resistor 110, Step V16: comparing the voltage $U_{am}$ dropping at the measuring resistor 110 to the upper threshold value, and evaluating that the second line 203 is interrupted if it is greater than the upper threshold value. If it is not greater than the upper threshold value, it is evaluated that the third line 204 is interrupted.

Continuing with the second example, the value of the calibration resistor 212 can, for example, be determined following the determination that none of the two lines 203, 204 is interrupted.

For this purpose, a switching configuration according to FIG. 3 is again first produced (step V21), i.e., the intermediate switch $Swt_{APE}$ and the further switch $Swt_{MES}$ are closed, the first switch $Swt_{APE}$ and the fourth switch $Swt_{RE}$ are open, and it is verified that the voltage dropping at the measuring resistor 110 is less than a specified limit value (in the example 100 mV) (step V22). With a known value of the measuring resistor 110 and a known value of the current I generated by the current source 101 and with the resistances of the lines 203, 204 neglected, the value of the calibration resistor 212 results directly on the basis of Kirchhoff's rules and Ohm's law from the voltage $U_{am}$ dropping at the measuring resistor 110 (step V23).

However, an inaccuracy in this procedure results from the line resistances being neglected, so that the value of the calibration resistor 212 is accordingly determined too large.

In order to improve this, a further measurement of the voltage $U_{am}$ dropping at the measuring resistor 110 can subsequently be carried out (step V25), namely with intermediate switch $Swt_{APE}$ closed and further switch $Swt_{MES}$ open, as in FIG. 2 (step V24). Optionally, the current I impressed by the current source 101 may be selected larger (for example 10 mA instead of previously during this further measurement than it is generally the case during a measurement of the oxygen concentration, which is likewise usually carried out in this switch position. In this way, the accuracy of the method is generally improved.

It is subsequently possible to determine the value of the resistance of the second line 203 on the basis of these measurements as well as Kirchhoff's rules and Ohm's law (step V26). The influence of the resistance of the second line 203 on the result of the first measurement for determining the calibration resistor 212 can then be compensated.

In order to also compensate for the influence of the resistance of the third line 204 on the result of the first measurement for determining the calibration resistor 212, it can be assumed that the resistance of the third line 204 is equal to the resistance of the second line 203. This is justified since in the vehicle, the lines 201, 202, 203, 204 are usually laid in a common cable harness, have the same length and thus have a generally very similar resistance.

Presupposing a corresponding additional or alternative circuitry and measurement, it is alternatively also possible to deduce the resistance of the third line 204 analogously to the above by measurement and to thus compensate for the influence of the third line 204 on the result.

Figure 6:
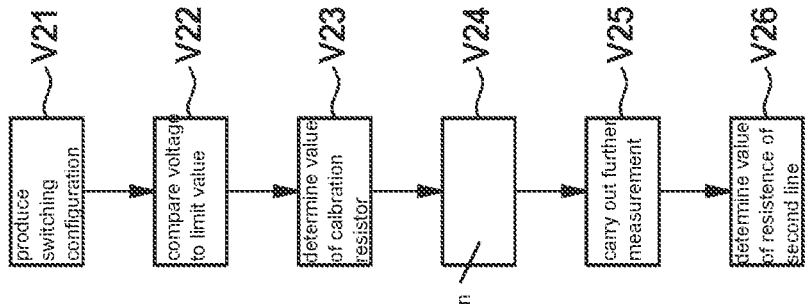
FIG. 6 shows a flow chart of the method steps of the method according to the present invention for determining the value of a calibration resistor of a wideband lambda sensor.

The steps explained above for determining the value of the calibration resistor 212 are shown again in FIG. 6 using a flow chart.

The invention claimed is:

1. A control unit for a combustion engine and configured to diagnose electrical lines between the control unit and a wideband lambda sensor, the wideband lambda sensor including a first electrical connector, a second electrical connector, a third electrical connector, an electrochemical pump cell connected between the first electrical connector and the second electrical connector, and an electrical calibration resistor connected between the second electrical connector and the third electrical connector, the control unit comprising:
   a first electrical input;
   a second electrical input;
   a third electrical input;
   a measuring resistor connecting the second input to the third input;
   an intermediate switch;
   a current source, which can be connected to the second input by the intermediate switch;
   a further switch;
   a reference potential;
   a reference resistor, wherein the reference resistor on the one hand can be connected via the further switch to the third input and to the measuring resistor and on the other hand is connected to the reference potential; and
   a measuring arrangement configured to measure a voltage drop across the measuring resistor;
   wherein a first line connects the first connector of the wideband lambda sensor to the first input of the control unit, a second line connects the second connector of the wideband lambda sensor to the second input of the control unit, and a third line connects the third connector of the wideband lambda sensor to the third input of the control unit.

2. The control unit according to claim 1, wherein the measuring arrangement is an analog-digital converter.

3. The control unit according to claim 1, further comprising:
   a multiplexer connected on the input side to the second input and the third input and connected on the output side to the measuring arrangement.

4. A method for diagnosing electrical lines between a wideband lambda sensor and a control unit for a combustion engine, wherein the wideband lambda sensor includes a first electrical connector, a second electrical connector, a third electrical connector, an electromechanical pump cell connected between the first electrical connector and the second electrical connector, and an electrical calibration resistor connected between the second electrical connector and the third electrical connector, and wherein the control unit includes a first electrical input, a second electrical input, a third electrical input, a measuring resistor connecting the second input to the third input, an intermediate switch, a current source, which can be connected to the second input by the intermediate switch, a further switch; a reference potential; a reference resistor, wherein the reference resistor on the one hand can be connected via the further switch to the third input and to the measuring resistor and on the other hand is connected to the reference potential, and a measuring arrangement configured to measure a voltage drop across the measuring resistor, and wherein a first line connects the first connector of the wideband lambda sensor to the first input of the control unit, a second line connects the second connector of the wideband lambda sensor to the second input of the control unit, a third line connects the third connector of the wideband lambda sensor to the third input of the control unit, and the method comprising the following steps:
  measuring the voltage drop across the measuring resistor with intermediate switch closed and further switch open; and
  evaluating whether the second line is interrupted based on the voltage drop at the measuring resistor, and/or evaluating whether the third line is interrupted based on the voltage drip at the measuring resistor.

5. The method according to claim 4, wherein the evaluation as to whether the second line is interrupted is carried out based on a comparison of the voltage drop at the measuring resistor to an upper specified threshold value, and/or the evaluation as to whether the third line is interrupted is carried out based on a comparison of the voltage drop at the measuring resistor to a lower specified threshold value.

6. The method according to claim 4, wherein it is evaluated that the second line is interrupted if the voltage drop at the measuring resistor is greater than an upper specified threshold value; and/or that the third line is interrupted when the voltage drop at the measuring resistor is less than a lower specified threshold value; and/or that neither the second line is interrupted nor the third line is interrupted when the voltage drop at the measuring resistor is greater than the lower threshold value and is less than the upper threshold value.

7. The method according to claim 4, wherein a first voltage drop across the measuring resistor is measured while a current source generates a first current, and a second voltage drop across the measuring resistor is measured while the current source generates a second current, wherein the second current is greater than the first current, and the evaluation as to whether the second line is interrupted is carried out based on the second voltage drop at the measuring resistor, and the evaluation as to whether the third line is interrupted is carried out based on the first voltage drop at the measuring resistor.

8. The method according to claim 4, wherein the first current generated by the current source is identical to a current generated within the scope of measuring an oxygen concentration in an exhaust gas of a combustion engine by the wideband lambda sensor, as a control variable of a control loop that regulates a Nernst voltage formed at an electrochemical reference cell of the wideband lambda sensor to a constant value, the electrochemical reference cell being connected between the first electrical connector and the fourth electrical connector.

9. The method according to claim 8, wherein the evaluation as to whether the second line is interrupted is carried out based on the second voltage drop at the measuring resistor to an upper specified threshold value and the evaluation as to whether the third line is interrupted is carried out based on a comparison of the first voltage drop at the measuring resistor to a lower specified threshold value.

10. The method according to claim 7, wherein it is evaluated that the second line is interrupted when the second voltage drop at the measuring resistor is greater than an upper specified threshold value, and/or the third line is interrupted when the first voltage drop at the measuring resistor is less than a lower specified threshold value, and/or neither the second line is interrupted nor the third line is interrupted when the first voltage drop at the measuring resistor is greater than the lower threshold value and the second voltage drop at the measuring resistor is less than the upper threshold value.

11. The method according to claim 4, wherein based on a pre-evaluation that one of the second line and the third line is interrupted, it is evaluated that the second line is interrupted when the voltage drop at the measuring resistor is greater than a limit value, and it is evaluated that the third line is interrupted when the voltage drop at the measuring resistor is not greater than the limit value.

12. The method according to claim 11, wherein the pre-evaluation is carried out in the following steps:
  measuring the voltage drop across the measuring resistor with intermediate switch closed and further switch closed, and
  evaluating that one of the second line or the third line is interrupted when the voltage drop at the measuring resistor is greater than a minimum value.

13. The method according to claim 4, wherein the wideband lambda sensor includes a fourth electrical connector and an electrochemical reference cell connected between the first electrical connector and the fourth electrical connector.

14. The method according to claim 4, wherein the measuring arrangement is an analog-digital converter.

15. The method according to claim 4, wherein the control unit includes a multiplexer, which includes two inputs, which are connected to the second input and the third input of the control unit, and is connected on an output side to the measuring arrangement.

16. A method for determining a value of a calibration resistor of a wideband lambda sensor using a control unit, the control unit including a first electrical input, a second electrical input, a third electrical input, a measuring resistor connecting the second input to the third input, an intermediate switch, a current source, which can be connected to the second input by the intermediate switch, a further switch; a reference potential; a reference resistor, wherein the reference resistor on the one hand can be connected via the further switch to the third input and to the measuring resistor and on the other hand is connected to the reference potential, and a measuring arrangement configured to measure a voltage drop across the measuring resistor, wherein the wideband lambda sensor includes a first electrical connector, a second electrical connector, a third electrical connector, an electromechanical pump cell connected between the first electrical connector and the second electrical connector, an electrical calibration resistor connected between the second electrical connector and the third electrical connector, wherein a first line connects the first connector of the wideband lambda sensor to the first input of the control unit, a second line connects the second connector of the wideband lambda sensor to the second input of the control unit, and a third line connects the third connector of the wideband lambda sensor to the third input of the control unit, the method comprising the following steps:
  determining the value of the calibration resistor based on a first measurement of the voltage drop at the measuring resistor with intermediate switch closed and further switch closed and a second measurement of the voltage drop at the measuring resistor with intermediate switch closed and further switch open, and wherein the value of the calibration resistor is determined based on the first measurement and the second measurement in such a way that an influence of a resistance of the second line on a result is compensated.

\* \* \* \* \*